Aug. 1, 1967    J. A. ANDERSON ETAL    3,333,503
METHOD OF LOCATING CONCEALED COPPER MINERALIZATION
OF ENRICHED CHALCOCITE TYPE
Filed Aug. 7, 1963
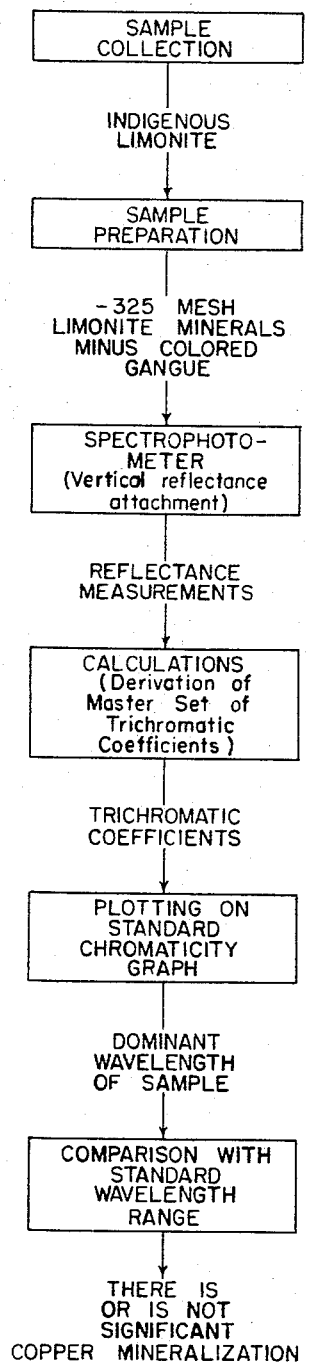
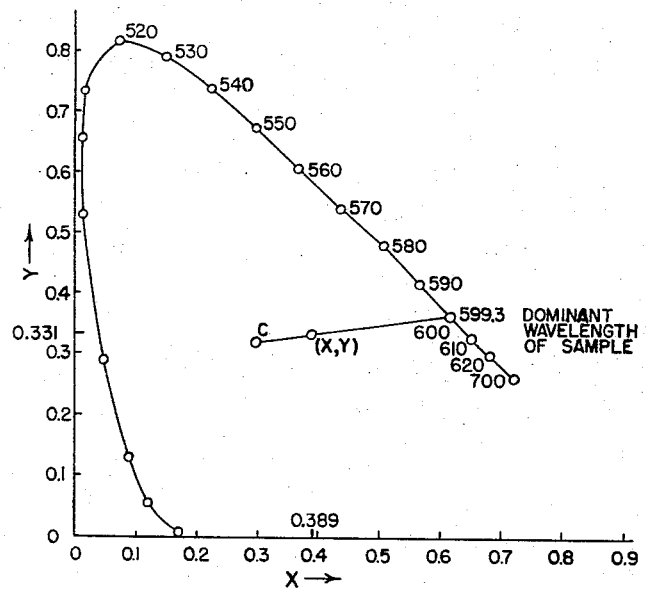
*INVENTORS*
JAMES A. ANDERSON
FRANKLIN F. CLARK
BY
ATTORNEYS

# United States Patent Office 3,333,503
Patented Aug. 1, 1967

3,333,503
METHOD OF LOCATING CONCEALED COPPER MINERALIZATION OF ENRICHED CHALCOCITE TYPE
James A. Anderson, Salt Lake City, Utah, and Franklin F. Clark, Denver, Colo., assignors to Bear Creek Mining Company, Salt Lake City, Utah, a corporation of Delaware
Filed Aug. 7, 1963, Ser. No. 300,578
3 Claims. (Cl. 88—14)

This invention relates to the art of geological exploration for concealed ore bodies and is particularly concerned with providing an effective method of locating concealed copper mineralization of enriched chalcocite type by colorimetry appraisal of leached cappings.

A capping (often referred to as a "gossan") from the geological point of view is the oxidized equivalent of a disseminated sulfide occurrence. Geologists recognize them by the presence of highly colored iron oxides and sulfates (limonite) filling boxworks, fractures, veins, and voids.

Where a capping has been leached over a period of time, it is possible that it is underlain by enriched disseminated copper sulfide of sufficient quantity to be regarded as an economically recoverable deposit of copper sulfide ore. There are two types of leached cappings, only one being important from the standpoint of the present invention because of the presence of a significant quantity of the mineral hematite. This important type of leached capping is formed by the oxidation of the minerals chalcocite and pyrite, with or without chalcopyrite, which yields limonite, a naturally occurring material made up of the minerals hematite, jarosite, and goethite in varying proportions.

In the making of this invention, an object was to provide a method whereby leached cappings of the foregoing important type can be identified on the basis of analysis of mineral samples gathered from a prospective area.

An important feature of the invention is the utilization of light reflection from a prepared sample of limonite concentrates derived from a prospective area, to provide a series of colorimetric measurements. These measurements are adjusted to compensate for energy variations in the incident light at different wavelengths and to yield three values for each measurement. Corresponding values are summed up to yield a master set of three values for trichromatic analysis. By applying trichromatic analysis to these master values, the dominant wavelength value of the limonite minerals in the sample is obtained.

Empirical results derived from measurements made on a number of known areas have shown that the range of wavelength values 586–602 millimicrons indicates the probable presence of copper mineralization of enriched chalcocite type, that is to say, that enough chalcocite has been oxidized to form a worthwhile ore deposit. Accordingly, if the dominant wavelength value of the sample of limonite minerals taken from an unknown area lies within the specified range, that is a strong indication that the desired copper mineralization exists in such area. This is so because a dominant wavelength value between 586 and 602 millimicrons indicates a significant quantity of hematite in the limonite concentrates, and the quantity of hematite produced during the oxidation of sulfides is a function of the quantity of chalcocite originally present.

Although cappings formed by oxidation of a chalcocite blanket indicate copper-rich areas that are likely to overlie reprecipitated chalcocite ore formed during oxidation and leaching of the blanket, there is no certainty that this is so. The indication provided by the present method should be coupled with appraisal of alteration, structure, and rock types in order to outline an area having the greatest potential for chalcocite-enriched porphyry copper ore.

The method is described in detail hereinafter with reference to the accompanying drawing and with respect to specific procedures presently regarded as the best mode of carrying out the invention in actual practice.

In the drawing:
FIG. 1 is a flow sheet representing major steps in the method; and
FIG. 2, a standard chromaticity diagram showing a representative set of derived trichromatic coefficients plotted thereon to yield the dominant wavelength of a sample of limonite taken from a prospective area.

Referring to the drawing, as is indicated in FIG. 1 thereof, the first step in the method is the collection of a representative sample of indigenous limonite from the prospective area. As previously mentioned, the prospective area will be a capping or gossan recognizable by the presence of highly colored iron oxides and sulfates, i.e. limonite.

*Sample collection*

Sample collection will ordinarily be carried out in accordance with accepted geological practice relative to either surface or subsurface or both. Thus, for example, one acceptable way of surface sampling is to lay out a usual grid of sample locations over the area concerned and to take a sample from each location, i.e. the area in the immediate vicinity of a grid point. Good sampling practice suggests that the sample be taken over an area of about twenty-five square feet of a selected outcropping proximate the grid point, the selection being made on the basis of which outcropping contains the most limonite. Such a selected outcropping should be no more than one-third grid interval from the particular grid point concerned.

Indigenous limonite is distinguished from exotic limonite by its occurrence as disseminated particles or as thin coats in and adjacent to voids and boxworks or as fillings in short discontinuous veinlets or as diffusion saturation of rock. Exotic limonite occurs as cementing material in alluvium, as crusts along large faults and throughgoing veins, and as thick crusts or "paint" coating a rock. It is not to be sampled.

Each sample should contain approximately two pounds of rock in instances where there is a reasonably abundant occurrence of limonite. Where the occurrence is lean, a greater quantity should be taken. Hand size specimens are preferred to chips, and the sample should include all limonite types and colors but not those stained with copper.

*Sample preparation*

Sample preparation should include an initial careful visual examination of the rocks making up the sample and rejection of any stained with copper. Thereupon the rocks making up the sample are crushed in any suitable type of crusher to about minus 48 mesh and subjected to a screening operation to yield a crushed sample which is preferably made up of rock particles in a size range from minus 48 to plus 325 mesh. This sized material is then passed through a magnetic separator, preferably a Frantz Model L-1, to separate as much of the gangue as possible from the limonite minerals. It is preferred that there be several runs through the separator for the purpose.

There should be a final working over of the concentrate thus obtained to remove, so far as is reasonably possible, all mafic and other colored gangue materials. White gangue materials, such as quartz and sericite, may be left in the sample, inasmuch as they are not detrimental to wavelength measurements, although all reasonable efforts should be made to remove this gangue material also.

A quantity of the final concentrate, usually one gram, is pulverized to minus 325 mesh and mounted in a recessed sample holder. It is compressed therein to remove surface irregularities.

*Reflectance measurements*

The sample holder is inserted in a commercial type of spectrophotometer having a vertical reflectance attachment, and reflectance measurements are made at 10 millimicron intervals over the visual range (400 to 700 millimicrons). The spectrophotometer can be either of automatic or manual recording type for producing reflection curves. Instrument drift must be guarded against by periodic checks made with respect to standard samples.

*Calculations*

The reflectance measurements must be corrected for energy distribution of the light used to illuminate the sample in the spectrophotometer. Most commercial instruments of this type use what is known as "standard illuminant C," a tungsten lamp operated at a temperature such as will provide lighting approximately the equivalent of average daylight.

There are several recognized ways of making the correction. That known as "the weighted ordinate method" is preferred, because of the degree of accuracy required. In the use of this method, the measurements are marked on a standard trichromatic chart made up of energy coefficients for each wavelength. Such a chart, containing a set of measurements representing one actual application of the present inventive method, appears below. The energy distribution of illuminant C is taken from the 1936 edition of Hardy's "Handbook of Colorimetry," published by Technology Press, Massachusetts Institute of Technology, Cambridge, Mass.

STANDARD TRICHROMATIC CHART

| Wavelength in Millimicrons | Reflectance of Sample in Percent | Energy Coefficients for Illuminant C | | |
|---|---|---|---|---|
| | | EX | EY | EZ |
| 400 | 5.6 | 0.914 | 0.025 | 4.335 |
| 410 | 5.6 | 3.478 | 0.097 | 16.575 |
| 420 | 5.9 | 13.188 | 0.392 | 63.361 |
| 430 | 6.0 | 31.916 | 1.304 | 155.742 |
| 440 | 6.1 | 42.148 | 2.794 | 211.433 |
| 450 | 6.2 | 41.689 | 4.712 | 219.813 |
| 460 | 5.9 | 35.811 | 7.386 | 205.490 |
| 470 | 5.7 | 24.188 | 11.266 | 159.456 |
| 480 | 5.8 | 11.849 | 17.222 | 100.711 |
| 490 | 5.9 | 3.864 | 25.106 | 56.134 |
| 500 | 6.0 | 0.551 | 36.208 | 30.492 |
| 510 | 5.9 | 0.953 | 51.457 | 16.181 |
| 520 | 5.9 | 6.131 | 68.799 | 7.583 |
| 530 | 6.1 | 16.216 | 84.476 | 4.130 |
| 540 | 6.2 | 29.648 | 97.403 | 2.079 |
| 550 | 6.7 | 45.601 | 104.674 | 0.922 |
| 560 | 7.0 | 62.598 | 104.774 | 0.406 |
| 570 | 8.4 | 77.971 | 97.390 | 0.211 |
| 580 | 9.3 | 89.607 | 85.086 | 0.150 |
| 590 | 10.8 | 95.678 | 70.552 | 0.108 |
| 600 | 12.2 | 95.259 | 56.601 | 0.068 |
| 610 | 12.9 | 88.651 | 44.465 | 0.033 |
| 620 | 13.8 | 75.277 | 33.566 | 0.017 |
| 630 | 14.4 | 56.535 | 23.320 | 0.008 |
| 640 | 14.8 | 39.322 | 15.365 | 0.003 |
| 650 | 15.2 | 25.007 | 9.437 | ------ |
| 660 | 15.6 | 14.497 | 5.362 | ------ |
| 670 | 15.9 | 7.543 | 2.762 | ------ |
| 680 | 16.5 | 3.928 | 1.428 | ------ |
| 690 | 16.6 | 1.818 | 0.658 | ------ |
| 700 | 16.9 | 0.866 | 0.313 | ------ |

Corrected values are obtained by multiplying the reflectance values by the respective energy coefficients. These appear below for the particular set of sample measurements contained in the foregoing standard trichromatic chart.

CORRECTED VALUES

| REX | REY | REZ |
|---|---|---|
| 5.118 | .140 | 24.276 |
| 19.477 | .543 | 92.820 |
| 77.809 | 2.313 | 373.830 |
| 191.496 | 7.824 | 934.452 |
| 257.103 | 17.043 | 1,289.741 |
| 258.472 | 29.214 | 1,362.841 |
| 211.285 | 43.577 | 1,212.391 |
| 137.872 | 64.216 | 908.899 |
| 68.724 | 99.888 | 584.124 |
| 22.798 | 148.125 | 331.191 |
| 3.306 | 217.248 | 182.952 |
| 5.623 | 303.596 | 95.468 |
| 36.173 | 405.914 | 44.740 |
| 98.918 | 515.304 | 25.193 |
| 183.818 | 603.899 | 12.890 |
| 305.527 | 701.316 | 6.177 |
| 438.186 | 733.418 | 2.842 |
| 654.956 | 818.076 | 1.772 |
| 833.345 | 791.300 | 1.395 |
| 1,033.322 | 761.962 | 1.166 |
| 1,162.160 | 690.532 | .830 |
| 1,143.598 | 573.598 | .426 |
| 1,038.823 | 463.211 | .235 |
| 814.104 | 335.808 | .115 |
| 581.966 | 227.402 | .044 |
| 380.106 | 143.442 | -------- |
| 226.153 | 83.647 | -------- |
| 119.934 | 43.916 | -------- |
| 64.812 | 23.562 | -------- |
| 30.179 | 10.923 | -------- |
| 14.635 | 5.290 | -------- |
| 10,419.798 | 8,866.247 | 7,490.810 |
| (SX) | (SY) | (SZ) |

Tristimulus values SX, SY, SZ, as used in calculations to obtain trichromatic coefficients X and Y, are the sums of the several corrected values REX, REY, REZ, respectively.

To obtain the trichromatic coefficients X and Y, the following formulae are used:

$$X = \frac{SX}{SX+SY+SZ}$$

$$Y = \frac{SY}{SX+SY+SZ}$$

Accordingly, for the particular sample under consideration:

$$SX+SY+SZ = 26{,}776.855$$

$$X = \frac{10{,}419.798}{26{,}776.855} = 0.388$$

$$Y = \frac{8{,}866.247}{26{,}776.855} = 0.331$$

These two trichromatic coefficients X and Y can be related to the dominant wavelength (hue) by two-dimensional plotting, as shown in the graph of FIG. 2 (see Hardy's Handbook for detailed graphs). Thus, the dominant wavelength of an unknown color is determined by plotting such trichromatic coefficients X and Y at point XY and by drawing a straight line through points C (plot of trichromatic coefficients for reference white sample) and XY to intersect the standard wavelength curve at point P, where the dominant wavelength—expressed in terms of millimicrons—can be read directly.

For the particular sample concerned, the graph of FIG. 2 (in its more detailed form from Hardy's book) shows that the dominant wavelength is 599.3 millimicrons. When this is compared with the reference range 586–602 millimicrons, it becomes immediately apparent that there is a good chance that copper mineralization of ore grade exists in the capping concerned and that, if other factors are right, further exploration or even mining activity is justified.

It should be noted that the results obtained have a high degree of reproducibility and are therefore dependable.

Although the invention was developed primarily for the locating of concealed copper mineralization of enriched chalcocite type, the concepts involved are applicable to the exploration for other types of concealed mineralization. Thus, the method of the invention has been applied to the location of concealed silver-lead-zinc ore occurring in veins and as replacement deposits underground. The mineral jarosite, whose wavelength is 576 millimicrons, has a correlation with the occurrence of silver-lead-zinc mineralization. We have found that a dominant wavelength range of from 576 to 580 millimicrons is indicative of silver-lead-zinc mineralization of ore grade.

Even the other type capping or gossan referred to hereinbefore, in connection with the enriched disseminated copper sulfide deposits, as not important because of the lack of a sufficient quantity of hematite, can be effectively appraised by utilizing the mineral jarosite as an indication. However, it is necessary in this instance to follow the dominant-wavelength-comparing step of the method with chemical analysis of the sample to distinguish between concealed copper mineralization and concealed silver-lead-zinc mineralization, inasmuch as the dominant wavelength range is 576 to 580 millimicrons, as in the case of silver-lead-zinc mineralization.

In both these instances it is important to distinguish worthwhile mineralized areas from barren pyritic areas. This is done by using known exploration techniques, for example detailed mineralogical determinations.

Whereas there are here specifically set forth certain preferred procedures which are presently regarded as the best mode of carrying out the invention, it should be understood that various changes may be made and other procedures adopted without departing from the inventive subject matter particularly pointed out and claimed herebelow.

We claim:
1. A geological exploration method for locating concealed copper mineralization of enriched chalcocite type, comprising
taking samples of indigenous limonite from a gossan, avoiding copper staining;
crushing said samples to substantially liberate the limonite minerals from attached gangue minerals;
separating at least the colored gangue minerals in the crushed samples from the limonite minerals;
pulverizing the resulting concentrates of limonite minerals;
forming a smooth-surfaced body of said limonite mineral concentrate;
making light-reflection measurements on said body at intervals along the visible spectrum and recording the resulting measurement values;
adjusting the measurement values to compensate for energy variations in the incident light at different wavelengths, thereby obtaining three values for each measurement value, which three values are useful for trichromatic analysis;
summing up the several corresponding values of said adjusted measurement values to give a master set of three values for trichromatic analysis;
applying trichromatic analysis to said set of three values in order to obtain the dominant wavelength value of the limonite minerals; and
comparing the resulting dominant wavelength value with the wavelength value range 586–602, which range indicates the probable presence of copper mineralization of enriched chalcocite type.

2. The geological exploration method recited in claim 1, wherein the light-reflection measurements are made by use of a spectrophotometer.

3. A geological exploration method for locating concealed chalcocitic copper mineralization, comprising
geologically sampling a prospective area for indigenous limonite, which includes the minerals hemotite, jarosite, and goethite;
crushing the samples to substantially liberate the limonite minerals from attached gangue minerals;
removing gangue minerals from the limonite minerals in the crushed material to leave essentially limonite minerals in the samples;
spectrophotometrically analyzing the limonite samples to determine the relative proportions of the said minerals therein;
and comparing the results of the analysis with corresponding results indicative of known chalcocitic mineralization, for predicting the presence or absence of significant chalcocitic copper mineralization at depth below the said area sampled.

References Cited
UNITED STATES PATENTS 2,330,026   9/1943   Blau _____ 88—14

OTHER REFERENCES

Johannsen, A., Manual of Petrographic Methods, N.Y., McGraw-Hill, 1918, p. 537.

Mellon, M. G., The Role of Spectrophotometry in Colorimetry in Industrial and Engineering Chemistry, vol. 9, 1937, pp. 51–55.

Stimson, M. M., O'Donnell, M. J., The Infrared and Ultra Violet Absorption Spectra of Cytosine and Isocytosine in the Solid State. In American Chemical Society Journal, vol. 74, April–June 1952, pp. 1805–1808. P. 1805 relied on.

JEWELL H. PEDERSEN, *Primary Examiner.*

A. A. KASHINSKI, *Assistant Examiner.*